United States Patent
Kawai

(10) Patent No.: US 7,419,270 B2
(45) Date of Patent: Sep. 2, 2008

(54) DISPLAY APPARATUS AND ITS LAMP-LIGHTING MECHANISM

(75) Inventor: Hisashi Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 11/267,637

(22) Filed: Nov. 4, 2005

(65) Prior Publication Data
US 2006/0109387 A1  May 25, 2006

(30) Foreign Application Priority Data
Nov. 24, 2004   (JP)   ............................. 2004-338923

(51) Int. Cl.
*G03B 21/20* (2006.01)
*G03B 21/16* (2006.01)
*G03B 21/18* (2006.01)
*G06F 12/00* (2006.01)

(52) U.S. Cl. .......................... 353/85; 353/52; 711/100

(58) Field of Classification Search .................. 353/85, 353/52, 122; 345/87; 362/561; 711/100
See application file for complete search history.

(56) References Cited

U.S. PATENT DOCUMENTS
2003/0113034 A1 *  6/2003  Komiya et al. ............. 382/284

FOREIGN PATENT DOCUMENTS
JP   7-270911 A   10/1995
JP   8-017582 A   1/1996

* cited by examiner

*Primary Examiner*—Diane I. Lee
*Assistant Examiner*—Magda Cruz
(74) *Attorney, Agent, or Firm*—Canon U.S.A. Inc., IP Division

(57) ABSTRACT

At least one exemplary embodiment is directed to a projection-type image display apparatus in which a wrong operation caused by noise occurring during lighting a light source lamp is reduced by prohibiting a read and/or write operation for at least a part of a period up to lighting the light source lamp.

8 Claims, 3 Drawing Sheets

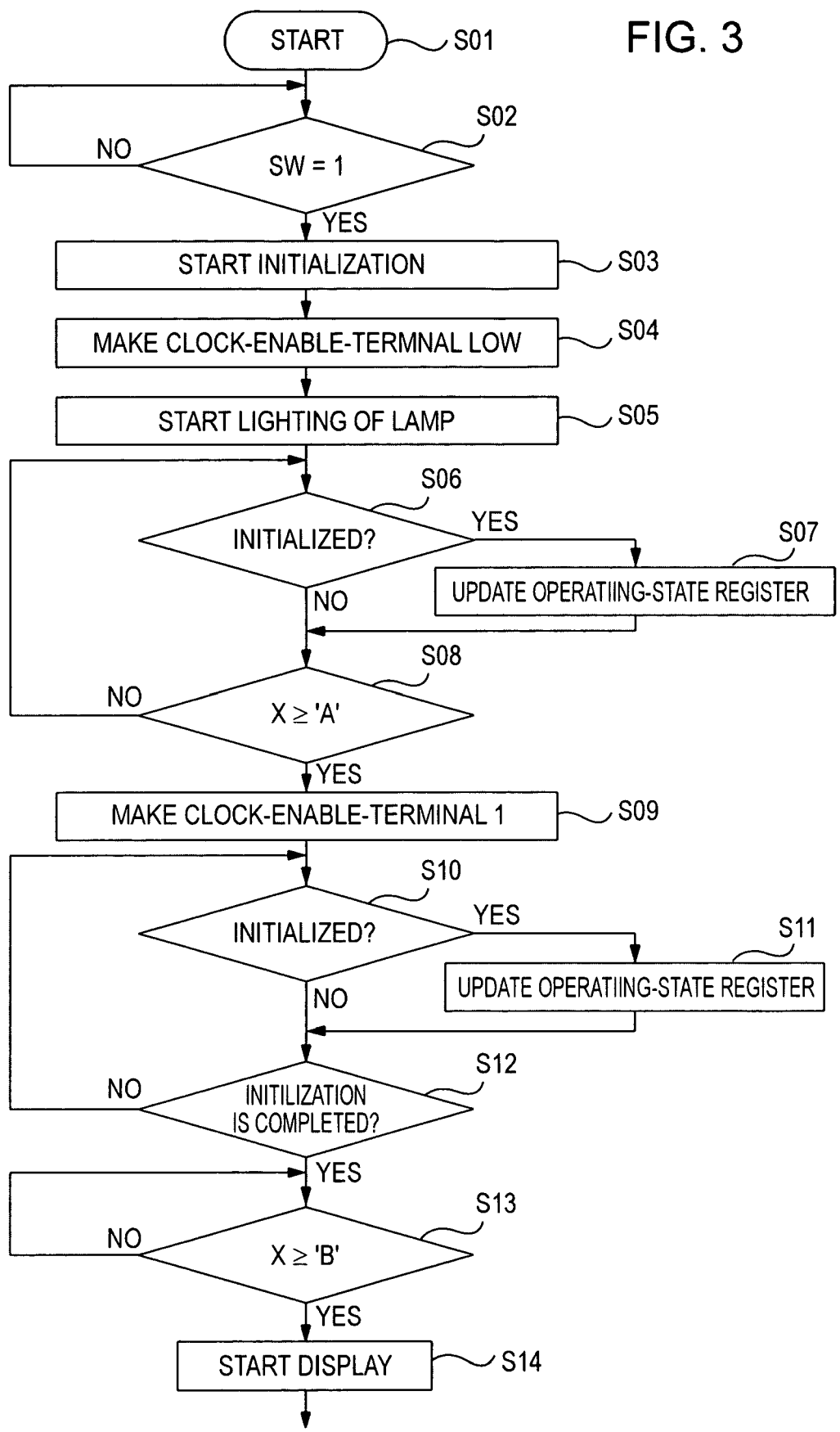

DISPLAY APPARATUS AND ITS LAMP-LIGHTING MECHANISM

BACKGROUND OF THE INVENTION

1. Field of the Invention

The present invention relates to a lamp-lighting control circuit and, in particular, though not exclusively, it relates to controlling the lighting of a lamp.

2. Description of the Related Art

In a projection-type display apparatus (e.g., a liquid crystal projector), light emitted from a light source lamp is illuminated on a light valve (e.g., liquid crystal).

When driven by a signal (e.g., a TV video signal, a video signal from a personal computer, or other signals related to light control as known by one of ordinary skill in the relevant art or equivalents), the light valve modulates the received light so that the modulated light is projected onto a screen through a projection lens.

The projection-type display apparatus includes a controller controlling a variety of elements and operating in accordance with an instruction from an operation unit (e.g., a remote control device or a key-input circuit).

Also, the display apparatus includes an image-signal processing unit and a video signal processing circuit. When the power source of the display apparatus is turned on, the image-signal processing unit performs a variety of initialization processes in accordance with a control signal from the controller and then starts a displaying operation.

A high-voltage discharge lamp (e.g., a metal halide lamp or a halogen lamp) typically serves as the light source lamp.

Light emitted from the lamp is incident on the light valve (e.g., a liquid crystal panel). Video light is obtained by controlling the intensity of the light, which is transmitted through or reflected at the light valve by modulating the liquid crystal panel with a signal from the video signal processing circuit. The video signal is projected onto and displayed on the screen through the projection lens.

When the power source is turned on, each of the electrical circuits can be initiated and the power source lamp can be lighted.

Since a high-voltage discharge lamp generally serves as the power source lamp in a liquid crystal projector, one can apply a high voltage on the lamp at the time of lighting the lamp, thereby causing strong ignition noise at that time.

As a result, the noise sometimes brings an unexpected electrical change to a ground line, a control line, and a power source line and causes errors in (i.e. wrong operations of) peripheral circuits.

In particular, when the temperature around the lamp is high, the lighting of a light source lamp is difficult, resulting in an increase in the number of retries of lighting operations.

The number of occurrences of noise generations increases as the number of retries increases, thereby increasing the possibilities of wrong operations.

Of the wrong operations of the circuits, one of the most influential one occurs when all control terminals are in a LOW state because the Low state of all control terminals brings the image memory in an operation-mode setting state.

Since the operation mode of the image memory is decided in accordance with a data signal on this occasion, if influenced by noise, the display apparatus results in operating in a wrong operation mode set.

Especially, when the image memory is set in a setting-prohibition mode, the display apparatus sometimes does not recover to its normal state without turning on and off its power SW.

When the wrong operation mode is set in the image memory as described above, sometimes an image of a color signal using the image memory is displayed longer than it is wide or in a piecemeal fashion on the screen.

Table 1 shows a function truth table for part of the control signals and setting operations of the image memory. It is understood from Table 1 that mode setting is established when all signals of CS, RAS, CAS, and WE are LOW.

Also, the RAS signal can be High upon data-writing, although when influenced by noise the RAS signal can become LOW, thus bringing the image memory into a mode-register writing state.

TABLE 1

Function Truth Table (1/2)

| State | CS | RAS | CAS | WE | BA | ADDR | Note for Operation |
|---|---|---|---|---|---|---|---|
| Idle | H | X | X | X | X | X | NOP |
|  | L | H | H | H | X | X | NOP |
|  | L | H | H | L | BA | X | ILLEGAL |
|  | L | H | L | X | BA | CA, A9 | ILLEGAL |
|  | L | L | H | H | BA | RA | LOW Active |
|  | L | L | L | L | L | Op-Code | Mode-Register Write |
|  | L | L | H | L | BA | A9 | NOP |
| Active (ACT) | L | L | L | H | X | X | Auto-Refresh/Self-Refresh 5 |
|  | H | X | X | X | X | X | NOP |
|  | L | H | H | X | X | X | NOP |
|  | L | H | L | H | BA | CA, A9 | Read |
|  | L | H | L | L | BA | CA, A9 | Write |
|  | L | L | H | H | BA | RA | ILLEGAL |
|  | L | L | H | L | BA | A9 | Pre-charge |
|  | L | L | L | X | X | X | ILLEGAL |
| Read (RD) | H | X | X | X | X | X | NOP (Keep LOW Active State after Burst) |
|  | L | H | H | H | X | X | NOP (Keep LOW Active State after Burst) |
|  | L | H | H | L | X | X | 1, 2, 4, 8 Burst Length: ILLEGAL Full-Page Burst: Burst Stop → LOW Active |
|  | L | H | L | H | BA | CA, A9 | Suspend Burst & Start New Read 3 |
|  | L | H | L | L | BA | CA, A9 | Suspend Burst & Start Write 3 |
|  | L | L | H | H | BA | RA | ILLEGAL |
|  | L | L | H | L | BA | A9 | Suspend Burst & Perform Pre-Charge |
|  | L | L | L | X | X | X | ILLEGAL |
| Write (WT) | H | X | X | X | X | X | NOP (Keep LOW Active State after Burst) |
|  | L | H | H | H | X | X | NOP (Keep LOW Active State after Completion of Burst) |
|  | L | H | H | L | X | X | 1, 2, 4, 8 Burst Length: ILLEGAL Full-Page Burst: Burst Stop → LOW Active |
|  | L | H | L | H | BA | CA, A9 | Suspend Burst & Start New Read 3 |
|  | L | H | L | L | BA | CA, A9 | Suspend Burst & Start Write 3 |
|  | L | L | H | H | BA | RA | ILLEGAL |

Table 2 shows mode registers. When the influence of lamp-lighting noise causes the RAS signal to become LOW upon data-writing, a value of the data-writing address at that time is wrongly employed as an operation-mode setting data of the image memory.

Since Reserved shown in Table 2 indicates an illegal setting state, once the image memory is wrongly set in the Reserved state, the image memory cannot be returned to the normal state.

Since register-setting especially at the time of operation mode setting is performed when all control signals are LOW, strong noise occurring upon lighting the lamp highly possibly causes all control signals to be LOW.

TABLE 2

Mode-Setting Address Key

| Operation Code | | | CAS Latency | | | | Burst Type | | Burst Length | | | | |
|---|---|---|---|---|---|---|---|---|---|---|---|---|---|
| A8 | A7 | TM | A6 | A5 | A4 | CL | A3 | BT | A2 | A1 | A0 | BT = 0 | BT = 1 |
| 0 | 0 | Mode Setting | 0 | 0 | 0 | Reserved | 0 | Sequential | 0 | 0 | 0 | 1 | Reserved |
| 0 | 1 | Vender | 0 | 0 | 1 | Reserved | 1 | Interleave | 0 | 0 | 1 | 2 | Reserved |
| 1 | 0 | Use | 0 | 1 | 0 | 2 | | | 0 | 1 | 0 | 4 | 4 |
| 1 | 1 | Only | 0 | 1 | 1 | 3 | | | 0 | 1 | 1 | 8 | 8 |
| | | Light Burst Length | 1 | 0 | 0 | Reserved | | | 1 | 0 | 0 | Reserved | Reserved |
| A9 | | Length | 1 | 0 | 1 | Reserved | | | 1 | 0 | 1 | Reserved | Reserved |
| 0 | | Burst | 1 | 1 | 0 | Reserved | | | 1 | 1 | 0 | Reserved | Reserved |
| 1 | | Single Bit | 1 | 1 | 1 | Reserved | | | 1 | 1 | 1 | Full Page | Reserved |

Additionally, in order to obtain brighter projection light, the lamp can use a greater amount of power, which is accompanied by an increased level of noise.

Accordingly, making the lamp brighter can lead to more difficulty in fully inhibiting the noise.

Although influence of lamp-lighting can be inhibited by making the housing of the display apparatus larger, this causes the housing to have a greater external size.

SUMMARY OF THE INVENTION

At least one exemplary embodiment is directed to a lamp-lighting control circuit for use in equipment including a light-source lamp and a projection-type display apparatus (e.g., a liquid crystal projector).

At least one exemplary embodiment is directed to a projection-type display apparatus in which the occurrence of a wrong setting of an image memory caused by the lighting noise of a lamp is reduced without making larger the external size of the housing of the display apparatus.

At least one exemplary embodiment is directed to a control unit configured to (a) perform clock enable control for activating an operation of an image memory and temporally suspending the operation and (b) control a period of the temporal suspension and so forth in accordance with a timing of the lighting of a lamp.

In at least one exemplary embodiment, a liquid crystal projector serving as an example of the display apparatus is brought in a standby state when electrical power is fed from an AC power source. Subsequently when a power switch (SW) is pressed down via a remote control device or an operation panel, the control unit initializes each of circuits.

In accordance with at least one exemplary embodiment, by controlling the image memory, the lamp is made brighter, and, even when the power consumption is increased, the display apparatus operates stably without making its housing larger than necessary.

Further features of the present invention will become apparent from the following description of exemplary embodiments with reference to the attached drawings.

BRIEF DESCRIPTION OF THE DRAWINGS

FIG. 3 illustrates a flowchart of an operation of a controller upon turning a power source on.

DESCRIPTION OF THE EMBODIMENTS

Figure 1:
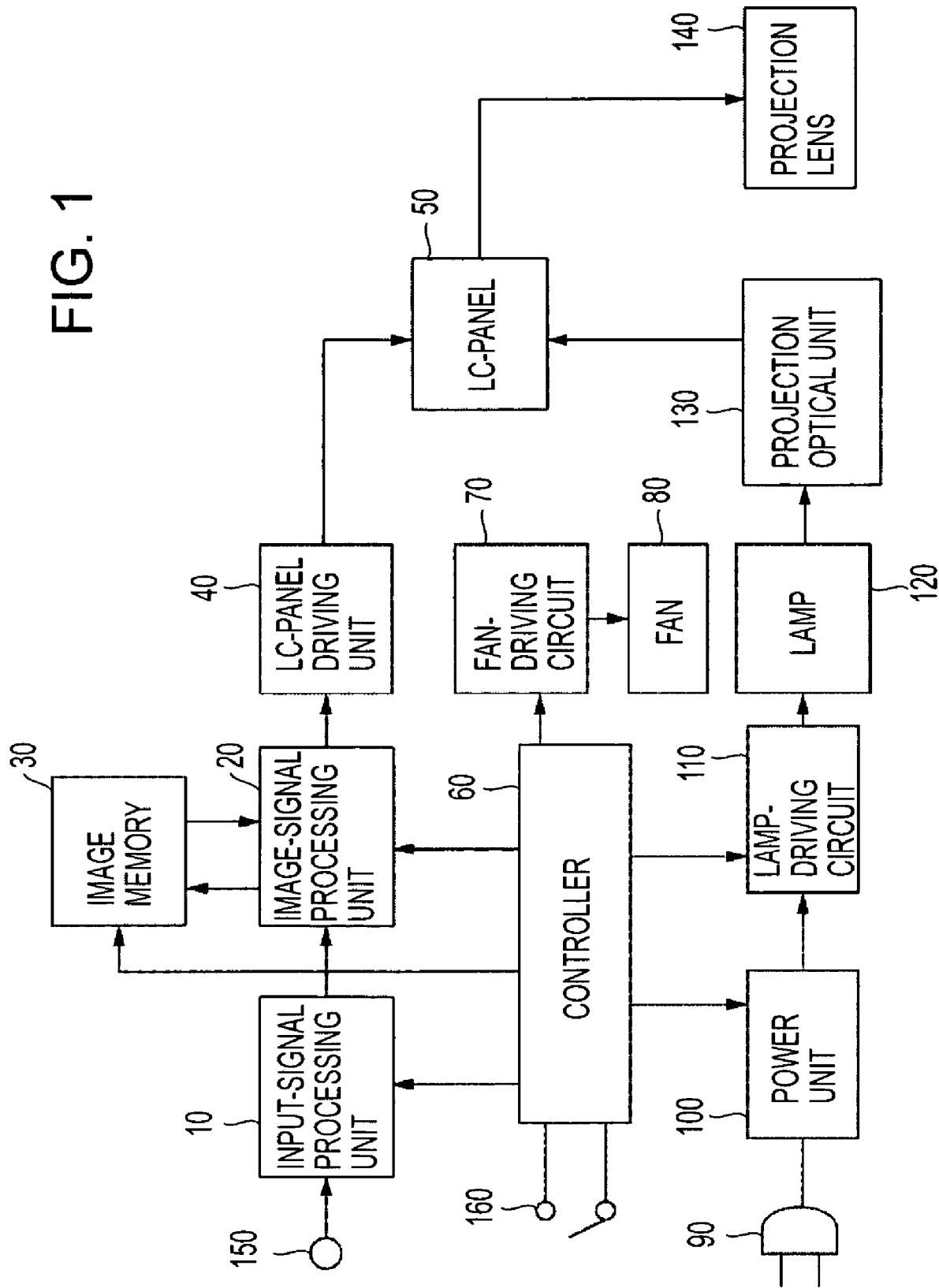
FIG. 1 illustrates a block diagram of a liquid crystal display apparatus according to at least one exemplary embodiment.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example certain circuitry for an input-signal processor, an image-signal processing unit, a fan driving circuit, and others may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

The exemplary embodiments can be used with many different types of display systems (e.g., liquid crystal projectors). The non-limiting examples described below refer to Liquid crystal projectors. However the invention can be used for a variety of display systems in which circuits (e.g., control circuits) and methods of the exemplary embodiments can be used and thus are not limited to liquid crystal projectors.

First Exemplary Embodiment

A liquid crystal projector, used to illustrate a first exemplary embodiment will be described with reference to FIG. 1.

The liquid crystal projector used to illustrate the first exemplary embodiment includes an input-signal processing unit 10, which converts an input signal received from an image-signal input terminal 150, which will be described later, into R, G, and B signals. An image-signal processing unit 20 converts the level, the number of scanning lines, the number of line dots, and the frame rate of the signal received from the input-signal processing unit 10 into respectively suitable levels for a display 50 (e.g., liquid crystal panel, hereinafter, a liquid crystal panel is abbreviated to an LC-panel), which will be described later. An image memory 30 temporally stores image data that the image-signal processing unit can use to compute the number of scanning lines, the number of line dots, and the frame rate of the signal. A display driving circuit (e.g., LC-panel driving unit 40 ) converts an output signal from the image-signal processing unit 20 so as to have the level for driving the following display (e.g., LC-panel 50). The display (e.g., LC-panel 50) can be driven by the driving circuit (e.g., LC-panel driving unit 40). A controller 60 controls the overall display system (e.g., liquid crystal projector). A fan-driving circuit 70 drives a cooling fan 80 in accordance with control of the controller 60. The cooling fan 80 can be used for cooling a lamp 120, which will be described later. A power connector 90 is connected to an AC power source for supplying electric power to the display system (e.g., liquid crystal projector). A power unit 100 generates electric power for supplying power to respective parts of the display system (e.g., liquid crystal projector). A lamp-driving circuit 110 receives electric power from the power unit 100 and drives the lamp 120 in accordance with a control signal from the controller 60. The lamp 120 is lighted by the lamp-driving circuit 110. A projection optical unit 130 separates light from the lamp into respective colors of light and emits the light towards the display (e.g., LC panel 50). A projection lens 140 forms an image from an optical signal modulated by the display (e.g., LC panel 50). Finally an image-signal input terminal 150 takes an externally inputted image signal into the display system (e.g., liquid crystal projector) and a power SW 160 activates the display system. Waiting state in which only the power source is connected When the display system (e.g., liquid crystal projector) is provided with electric power through the power connector 90, the power unit 100 feeds it to the controller 60. Upon supply of the electric power, the controller 60 initializes its internal components and is brought into a waiting state for waiting for turn-on of the power SW 160. General operation upon turning on power source When the power SW 160 is turned on, the controller 60 initializes the input-signal processing unit 10, the image-signal processing unit 20, the display driving unit (e.g., LC-Panel display driving unit 40), and so forth, and drives the fan-driving circuit 70 facilitating rotation of the cooling fan 80. Upon confirming rotation of the fan, the controller drives the lamp-driving circuit 120 facilitating lighting of the lamp 120.

Since a predetermined time period is needed from start of lighting the lamp 120 to a state in which the display (e.g., LC panel) has at least a certain degree of brightness, the controller waits for a time when a display image has a sufficiently recognizable degree of brightness and starts displaying an image.

Operation of controller Upon Initialization

Referring now to FIG. 3, an operation of the controller upon turning on the power source and lighting the lamp will be described.

When the controller starts up (step S01), it is brought into a state of waiting for turn-on of the power SW (step S02). Upon turn-on of the power SW (step S02—Condition YES), the controller starts initialization (step S03). Upon start of the initialization, the image-signal processing unit cancels reset, sets an operation mode, and promotes the initialization of the controller.

Then, the controller makes a clock enable terminal of the image memory LOW (step S04), starts a lamp-lighting operation, sets a value of a counter X at "0", and starts counting up to a time (time measurement) (step S05).

The controller determines whether the initialization of some of the configuration blocks (e.g., 10, 20, 30, 40, 70, 110, 130) shown in FIG. 1, having started the initialization, is completed (step S06). If the initialization of some of them is completed (step S06—Condition YES), the controller updates state registers of the initialized configuration blocks (step S07).

The controller determines whether the counter X indicates a value attaining a predetermined number A, and if so, makes the clock enable terminal of the image memory "1" (step S09). In other words, influence caused by lighting noise of the lamp can be reduced by disabling the image memory during a predetermined period from start of lighting the lamp.

Subsequently, the controller continues determination whether initialization of the remaining not-initialized configuration blocks is completed (step S10-S11). Upon determining that all initialization is completed (step S12—Condition YES), the controller determines whether the counter X indicates a value not smaller than B. If the value is not smaller than B (step S13—Condition YES), the controller starts display. In other words, when a predetermined time period elapses from the start of the lighting of the lamp and the light intensity of the lamp attains a predetermined or greater value, the controller starts display.

Since lighting the light source lamp is typically a must for the display, in general, information about whether the lamp is lighted, (e.g., a lighting signal of the lamp), is transmitted to the controller on the basis of amounts of voltage and current of a lamp supply source of the lamp-driving circuit.

With the aid of the lamp-lighting signal, an enable signal of the image memory can also be switched upon confirming that lighting of the lamp is completed. This corresponds to an additional or modified step, that of detection of a lamp-lighting completion signal from the lamp driving circuit, which can be inserted into step S8 shown in FIG. 3.

The elements of the display system (e.g., the lamp) are cooled by the cooling fan 80. In order to appropriately cool them, the display system (e.g., a liquid crystal projector) can have a temperature gauge disposed therein, for measuring the temperature of the lamp or a portion of the display system, (e.g., having a temperature associated with that of the lamp).

In a period shortly after turning the lamp off, the temperature of the lamp is still high. In this case, even a subsequent trial of lighting the lamp sometimes results in failure.

Hence, there is a possibility that the lamp is not lighted even after waiting for a predetermined time period and the controller continues the starting operation of lighting the lamp even when the memory starts to operate.

In at least one exemplary embodiment, the temperature of the lamp is measured and the period for making the clock enable terminal of the memory LOW is arranged so as to vary in accordance with the lamp temperature. With this, a disable time of the memory during the normal time can be made short.

In at least one exemplary embodiment, the lamp used illuminates light through aerial discharge between its two poles without a filament as included in a typical light valve. Thus, it is substantially free from a non-lighting problem caused by, for example, breakage of the filament as occurring in an electrical heating valve.

Since some lamps that can be used in exemplary embodiments have terminal poles that can become gradually blackened, the lamp does not have a so-called clear life span and merely darkens in accordance with decrease in the amount of illuminating light because of gradual blackening of the pole terminals. Hence, in at least one exemplary embodiment, the controller can accumulate lighting times of the lamp and determine the replacement time of the lamp on the basis of the accumulated lighting time.

The display system (apparatus) can have a function for noticing the replacement time to an operator when the replacement time comes, for example, by displaying it. Note that the longer the operation time, the harder it is to light the lamp.

Accordingly, on the basis of information included in the controller, about the accumulated operation time of the lamp, the controller can compute a time for lighting the lamp and facilitate the varying of a time for making the image memory disabled. With this arrangement, a start-up time of a new lamp can be set and the display apparatus can reduce the influence of lamp-lighting noise.

Second Exemplary Embodiment

Communication mute between the controller and the image-signal processing unit will be described.

When a display apparatus in operation according to a second exemplary embodiment does not receive a video signal for a predetermined time period, its internal timer is activated so as to extinguish the lamp. Since the performance of the lamp can deteriorate, for example, the lamp becomes darkened as an energizing time period of the lamp becomes longer, the above-described mechanism can be devised so as to make the life span of the lamp longer.

When the lamp is lighted again in the above-described state, the internal circuits of the display apparatus can operate normally, and the lamp is lighted in the normal state. In this case, the controller can communicate with the image-signal processing unit and the input-signal processing unit, in particular, for updating the signal level every V cycle, for example.

When the lamp is lighted in the above-described communication state, there is the possibility that noise is superimposed on a serial data clock signal and data in a wrong address is rewritten.

Hence, in the same fashion as in the first exemplary embodiment, during the lighting period of the lamp, no communication is performed for a predetermined period and the communication is restarted after completing the lighting of the lamp, thereby reducing the opportunity of an incorrect writing error of serial data.

Figure 2:
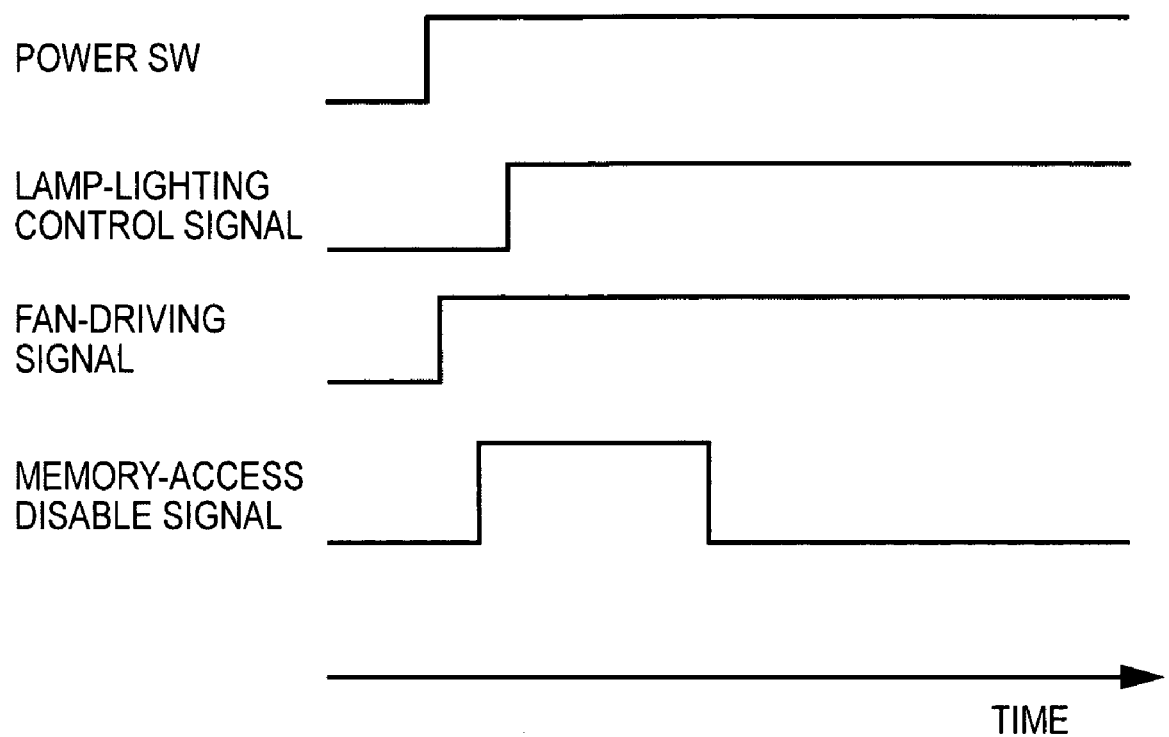
FIG. 2 illustrates a timing chart of signals including a memory control signal.

In at least one exemplary embodiment, when the power SW is turned on, the control unit can output a fan-driving signal for starting cooling of the lamp and then can output a lamp-lighting control signal for activating the light source lamp (FIG. 2).

After counting a predetermined time period sufficient for completing a lighting-start operation of the lamp, a memory-access disable signal of the image memory is switched from a disable state to an enable state. With this arrangement, a wrong operation of the image memory caused by lighting noise during activating the lamp can be reduced.

Instead of the entire lighting period, the image memory can be set in a disable state during at least the predetermined period in which the lighting noise is strong. As a matter of course, the disable period can be extended within the range in which delay of an operation start time of the image memory does not matter.

Also, in at least one exemplary embodiment the state of the image memory is switched from a clock enable state to a disenable state before outputting the lamp-lighting control signal and, then, a clock enable terminal of the image memory is switched to an enable state with the aid of the lamp-lighting signal from the lamp-driving circuit. In this case, a wrong operation of the image memory caused by lighting noise during activating the lamp can be reduced.

Since the lamp is lighted in a longer period when the lamp temperature is high than when it is low, the disable period of the image memory can be set in accordance with the lamp temperature detected by a lamp sensor. When the lamp is sufficiently cooled, the circuits of the display (e.g., liquid crystal projector) can be quickly started up.

Since the longer operation time of the lamp can cause it to be more difficult to determine a stable time of lighting-start, a time for making the image memory disable can be extended in accordance with an accumulated lighting time of the lamp. In this case, a start-up time of a new lamp can be made short.

With the above described exemplary embodiments of display apparatus (e.g., projection displays), wrong display caused by a wrong operation of the image memory during lighting the lamp can be reduced.

In at least one exemplary embodiment, a control circuit (e.g., a controller) controls whether data is read and/or written to a data storage device based on the lighting status of an illumination lamp. For example, the control circuit receives a lamp lighting status signal, when the lamp lighting signal indicates that a lamp has been recently turned on the control circuit prohibits the reading from and writing to the data storage device. When the power up of the lamp reaches a stable condition, a lamp lighting signal can indicate to the control circuit that a stable lighting condition has been reached (e.g., after a predetermined amount of time as discussed above). When the control circuit determines that a stable lighting condition has been reached, it can allow reading from and writing to the data storage device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-338923 filed Nov. 24, 2004, which is hereby incorporated by reference herein in its entirety.

What is claimed is:

1. A projection-type display apparatus, comprising:
a light valve for modulating light on the basis of an inputted video signal;
a light source configured to illuminate the light valve and project a video image corresponding to the video signal onto a screen;
a lighting device to light the light source;
a storing device configured to be read therefrom and/or to write therein data; and
a controller to prohibit reading data from the storing device and/or writing data to the storing device,
wherein the controller prohibits reading and/or writing to the storage device during a determined time period, wherein the determined time period is related with a time period of lighting the light source by the lighting device.

2. The projection-type display apparatus according to claim 1, wherein the storing device is an image memory for reading therefrom and writing therein data corresponding to a video signal.

3. The projection-type display apparatus according to claim 1, wherein the lighting device is configured to determine whether the light source is lighted, and where a prohibiting state of prohibiting reading and/or writing to the storage device set by the controller is released by the lighting device.

4. The projection-type display apparatus according to claim 1, wherein the determined time period is determined on the basis of a detected temperature associated with a temperature of the light source.

5. The projection-type display apparatus according to claim 1, wherein the determined time period is determined on the basis of the accumulated operation time of the light source.

6. The projection-type display apparatus according to claim 1, wherein communication between a control device and peripheral circuits is prohibited during at least a part of the determined time period.

7. The projection-type display apparatus according to claim 1, wherein the lighting device comprises a lamp-driving circuit that receives electric power from a power source and lights the light source by providing electric power to the light source in accordance with a control signal received from the controller.

8. An apparatus comprising:

a control circuit, wherein the control circuit receives a lamp lighting signal, wherein the control circuit prohibits reading from and writing to a data storage device when the lamp lighting signal indicates that a lamp has been recently turned on, and wherein the control circuit allows reading from and writing to the data storage device when the lamp lighting signal indicates a stable lighting condition.

* * * * *